US007436657B2

(12) United States Patent
Motai et al.

(10) Patent No.: US 7,436,657 B2
(45) Date of Patent: Oct. 14, 2008

(54) KEYBOARD ILLUMINATION DEVICE FOR PORTABLE COMPUTER (75) Inventors: Seiji Motai, Sagamihara (JP); Seiichi Idei, Machida (JP); Taketoshi Kohno, Sagamihara (JP); Noboru Aoyama, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/691,236

(22) Filed: Mar. 26, 2007

(65) Prior Publication Data
US 2007/0253182 A1 Nov. 1, 2007

(30) Foreign Application Priority Data
Apr. 28, 2006 (JP) .............................. 2006-126989

(51) Int. Cl.
*G06F 1/16* (2006.01)
(52) U.S. Cl. .......................... 361/683; 362/85; 362/561; 345/168; 349/58
(58) Field of Classification Search ................. 361/683
See application file for complete search history.

(56) References Cited

U.S. PATENT DOCUMENTS

| 5,091,873 | A | * | 2/1992 | Araki | 361/681 |
| 5,684,513 | A | * | 11/1997 | Decker | 345/168 |
| 5,815,225 | A | * | 9/1998 | Nelson | 349/65 |
| 6,145,992 | A | * | 11/2000 | Wattenburg | 362/85 |
| 6,161,944 | A | * | 12/2000 | Leman | 362/276 |
| 6,191,939 | B1 | * | 2/2001 | Burnett | 361/681 |
| 6,561,668 | B2 | * | 5/2003 | Katayama et al. | 362/85 |
| 6,626,552 | B2 | * | 9/2003 | Uehara et al. | 362/85 |
| 6,771,333 | B2 | * | 8/2004 | Tanaka et al. | 349/65 |
| 6,776,497 | B1 | * | 8/2004 | Huppi et al. | 362/85 |
| 6,902,286 | B2 | * | 6/2005 | Hunter | 362/85 |
| 2004/0061997 | A1 | * | 4/2004 | Skinner | 361/683 |

FOREIGN PATENT DOCUMENTS

| JP | 59004493 U | 1/1984 |
| JP | 04-333023 | 11/1992 |
| JP | 200433023 | 11/1992 |
| JP | 2004333023 | 11/1992 |

(Continued)

*Primary Examiner*—Lisa Lea-Edmonds
(74) *Attorney, Agent, or Firm*—Norman L. Gundel; Douglas A. Lashmit (57) ABSTRACT The present invention is directed to a device for illuminating a keyboard or other portion of a PC main body unit of a portable computer (e.g., a convertible PC that can be used as a notebook PC or a tablet PC) by utilizing a center latch mechanism. An embodiment of the invention includes a latch provided in the vicinity of an upper edge of the cover unit, and a latch receiving portion provided in the main-body unit. When the cover unit is closed, the latch receiving portion is engaged with the latch to secure the main-body unit and the cover unit in a position where the cover unit is closed. A light source is embedded in the cover unit in the vicinity of the latch, and a light-reflecting surface provided on a surface of the latch so that, when the cover unit is open, light from the light source can be reflected to the keyboard to illuminate the keyboard.

18 Claims, 10 Drawing Sheets

FOREIGN PATENT DOCUMENTS

| | | |
|---|---|---|
| JP | 08-076882 | 3/1996 |
| JP | 2008076882 | 3/1996 |
| JP | 2001022470 | 1/2001 |
| JP | 2005011096 | 1/2005 |
| JP | 2001195150 | 7/2007 |

* cited by examiner

KEYBOARD ILLUMINATION DEVICE FOR PORTABLE COMPUTER

BACKGROUND OF THE INVENTION

1. Technical Field

The present invention generally relates to portable computers. More specifically, the present invention relates to a keyboard illumination device for portable computers, including notebook portable computers that are convertible (switchable) to tablet computers.

2. Related Art

Notebook portable computers (hereinafter referred to as "notebook PCs"), which are becoming widespread today, have a mechanism that allows the notebook PCs themselves to illuminate the keyboards in order to allow the notebook PCs to be used without inconvenience even in environments where sufficiently bright illumination cannot always be obtained (e.g., when the user uses the notebook PC for work during in-flight sleep time while ensuring that it does not cause inconvenience to people around him or her.)

Figure 1:
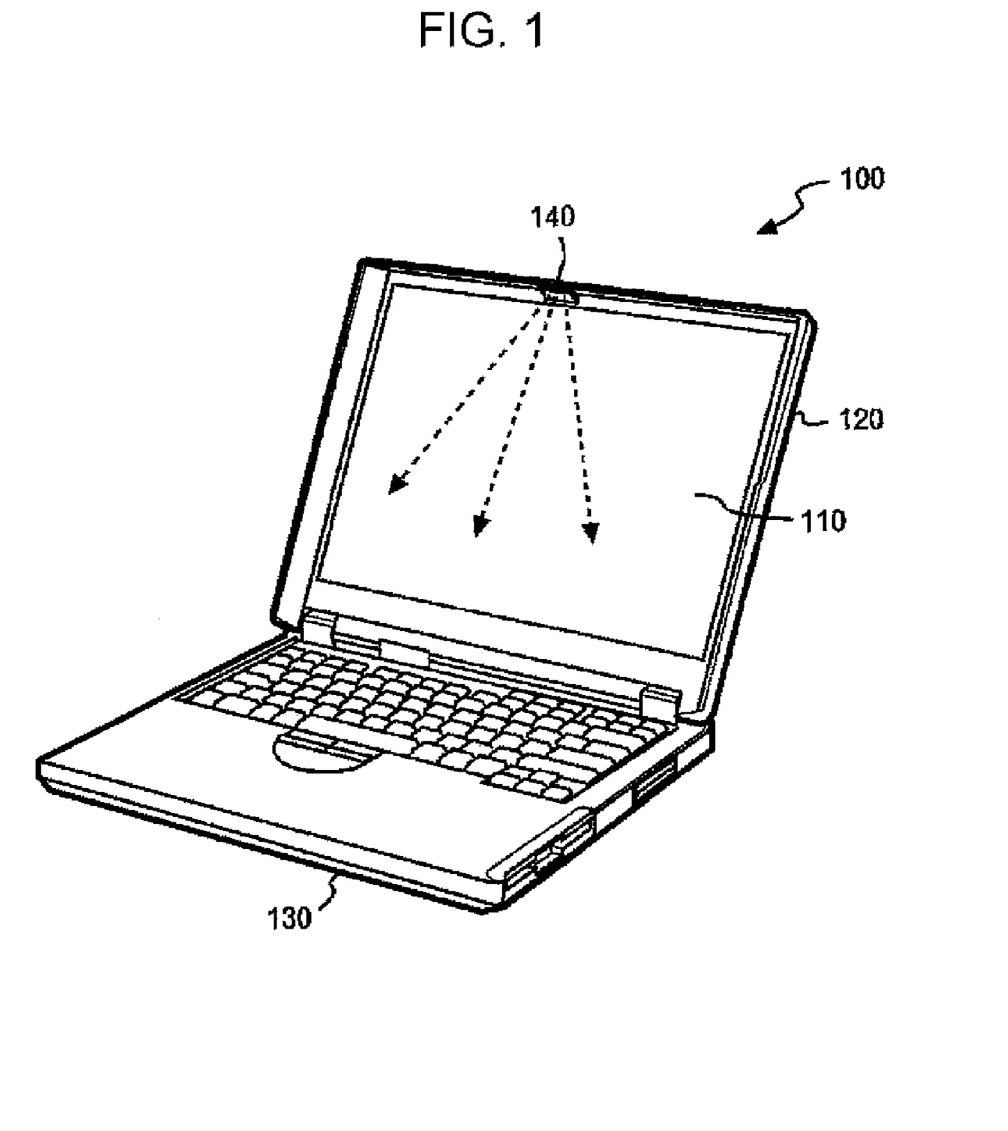
FIG. 1 shows an illumination mechanism of a typical notebook PC in the related art.

FIG. 1 shows a mechanism of a typical notebook PC. That is, a notebook PC 100 has a cover unit (a cover) 120 including a display screen 110, such as an LCD (liquid crystal display) device. Typically, the cover unit 120 has a structure in which the peripheral edge portion (in particular, the upper edge portion in the vicinity of the upper edge of the display screen) protrudes in the shape of a projection toward the front side of the display screen so that, when the cover unit is closed, a main unit (a main-body unit) 130 including a keyboard comes into close contact with the cover unit in such a manner that no gap appears therebetween. With this arrangement, a light source 140, such as an LED (light-emitting diode), is installed in an embedded manner in the projected portion in the vicinity of the center of the upper edge portion of the cover unit, so that light can be emitted downward to the keyboard, thereby making it possible to illuminate the keyboard and so on.

Today, while serving as notebook PCs, portable computers that can also serve as so-called "tablet portable computers" (hereinafter referred to as "tablet PCs") have become available (such dual-purpose portable computers will hereinafter be referred to as "convertible PCs"). A tablet PC has a display screen with a touch input system and allows inputting to the display screen in a tablet (a writing board or flat board) manner by using a finger or pen (stylus).

In the convertible PC that can be used as a notebook PC and a tablet PC, when the cover unit including the display screen is open, rotating the cover unit by 180° about a vertical axis passing through the display screen of the cover unit, i.e., switching the obverse surface (the side where the display screen is provided) and the reverse surface (the side where there is no display screen), and closing the cover unit again allows the cover unit to be overlaid on the upper surface (the surface having a keyboard and so on) of the main-body unit with the display screen side facing upward. This allows the PC to be used as a tablet PC in which the display screen is used as a handwriting input section. A main feature of mechanisms of the convertible PC is that, when the convertible PC is used in a tablet PC mode as described above, a center latch mechanism (a latch) provided at the center of the upper edge portion of the cover unit latches (secures) the cover unit and the main-body unit in order to prevent the cover unit from being easily opened.

When the convertible PC having such a mechanical feature is used in the tablet PC mode, the surface of the side having the display screen, such as an LCD, needs to be flat for use as a handwriting input section. Consequently, a projected portion provided in a typical notebook PC, which protrudes toward the front side of the display screen, cannot be provided on the cover unit. Thus, a PC having such a mechanism cannot employ a conventional mechanism and method for illuminating the keyboard surface by embedding a light source, such as an LED, for illuminating a keyboard in the projected portion of the cover unit and emitting light toward the lower edge of the cover unit, unless it is modified.

Some references are available regarding known technologies for illuminating a PC, including a keyboard, without providing a projected portion on a cover unit including the display screen of a notebook PC or the like or without providing a light source at a projected portion on the cover unit.

A technology disclosed in Japanese Unexamined Patent Application Publication No. 4-333023 is directed to a device and so on for a PC including a display device utilizing external light, such as a reflective LCD. When it cannot be expected to obtain sufficiently bright external light for illuminating the display screen of the PC, the disclosed device causes a point light source for illuminating the display screen, such as a reflective LCD, to protrude from the cover unit to a position where the display screen can be illuminated. However, because the device is intended to directly illuminate the display screen, the point light source must be made to protrude to a considerable degree from the cover unit including the display screen. This requires extra cost for providing a mechanism for making the point light source protrude. This configuration is also unsuitable as a mechanism to be employed for the convertible PC, since the surface at the display screen side cannot be made flat during use.

A technology disclosed in Japanese Unexamined Patent Application Publication No. 8-76882 is directed to a device for illuminating a keyboard and so on by utilizing light emitted from a fluorescent lamp for backlight which is built into a cover unit including a display screen. Light emitted from the fluorescent lamp is reflected by a reflector disposed on the upper edge portion of the cover unit, and the reflected light is focused on the keyboard by a condenser lens disposed below the reflector. However, since the light source of the device is a fluorescent lamp (e.g., a cathode tube) for backlight and not a point light source, the reflector and the condenser lens also need to have the same length as the longitudinal dimension of the fluorescent lamp. This leads to a large-scale device that requires extra cost. Although the light source is disposed inside the cover unit, the condenser lens and so on must be provided at a position that protrudes from the cover unit in order to illuminate the keyboard. Consequently, this configuration cannot also be employed as a mechanism for the convertible PC, as in the previous example.

SUMMARY OF THE INVENTION

Accordingly, the present invention provides a device for illuminating a PC main unit, including a keyboard, by utilizing a center latch mechanism. In particular, the present invention provides a device for illuminating a PC main body, including a keyboard and so on, without forming an additional projected portion at the display screen side of a cover unit, even for a PC for which it is not preferable to provide a projected portion at the display screen side, for example, for a convertible PC or the like that can be used as a notebook PC or a tablet PC.

A first aspect of the present invention provides a portable computer having a main-body unit and a cover unit. The main-body unit includes a keyboard and the cover unit has a display screen at one surface thereof. The portable computer includes (a) a latch provided in the vicinity of an upper edge of the cover unit, and (b) a latch receiving portion provided in the main-body unit. When the cover unit is closed, the latch receiving portion is engaged with the latch to secure the main-body unit and the cover unit in a position where the cover unit is closed. The portable computer further includes (c) a light source embedded in the cover unit in the vicinity of the latch, and (d) a light-reflecting surface provided on a surface of the latch so that, when the cover unit is open, light from the light source can be reflected to the keyboard to illuminate the keyboard.

A second aspect of the present invention provides a portable computer having a main-body unit and a cover unit. The main-body unit includes a keyboard and the cover unit has a display screen at one surface thereof. The portable computer includes (a) a latch provided in the vicinity of an upper edge of the cover unit, the latch having therein a parallelepiped hollow portion along the moving direction of the latch and having an opening in a predetermined portion at one end of the hollow portion, and (b) a latch receiving portion provided in the main-body unit. When the cover unit is closed, the latch receiving portion is engaged with the latch to secure the main-body unit and the cover unit in a position where the cover unit is closed. The portable computer further includes (c) a light source provided in the hollow portion of the latch at another end that is opposite to the one end having the opening and is oriented in a direction that allows light to be emitted toward the one end, and (d) a light-reflecting surface provided at the one end of the latch. When the cover unit is open, the light-reflecting surface is capable of receiving the light from the light source and is capable of reflecting the light so that the light passes through the opening and illuminates the keyboard.

It is to be noted that descriptions of the present invention do not include all features required for the present invention, and it goes without saying that a combination of some of the features of the present invention can also serve as an invention.

According to the present invention, for a convertible PC and so on that can be used as both a notebook PC and a tablet PC, it is possible to illuminate a PC main-body unit, including a keyboard, without forming an additional projected portion, other than a center latch mechanism, on the surface at the display screen side of the cover unit.

BRIEF DESCRIPTION OF THE DRAWINGS

Various embodiments for implementing the present invention will be described below in detail with reference to the accompanying drawings. The embodiments, however, are not intended to restrict the invention according to the claims, and all combinations of features described in the embodiments are not necessarily required as solving means for the invention.

DETAILED DESCRIPTION OF THE INVENTION

Figure 2:
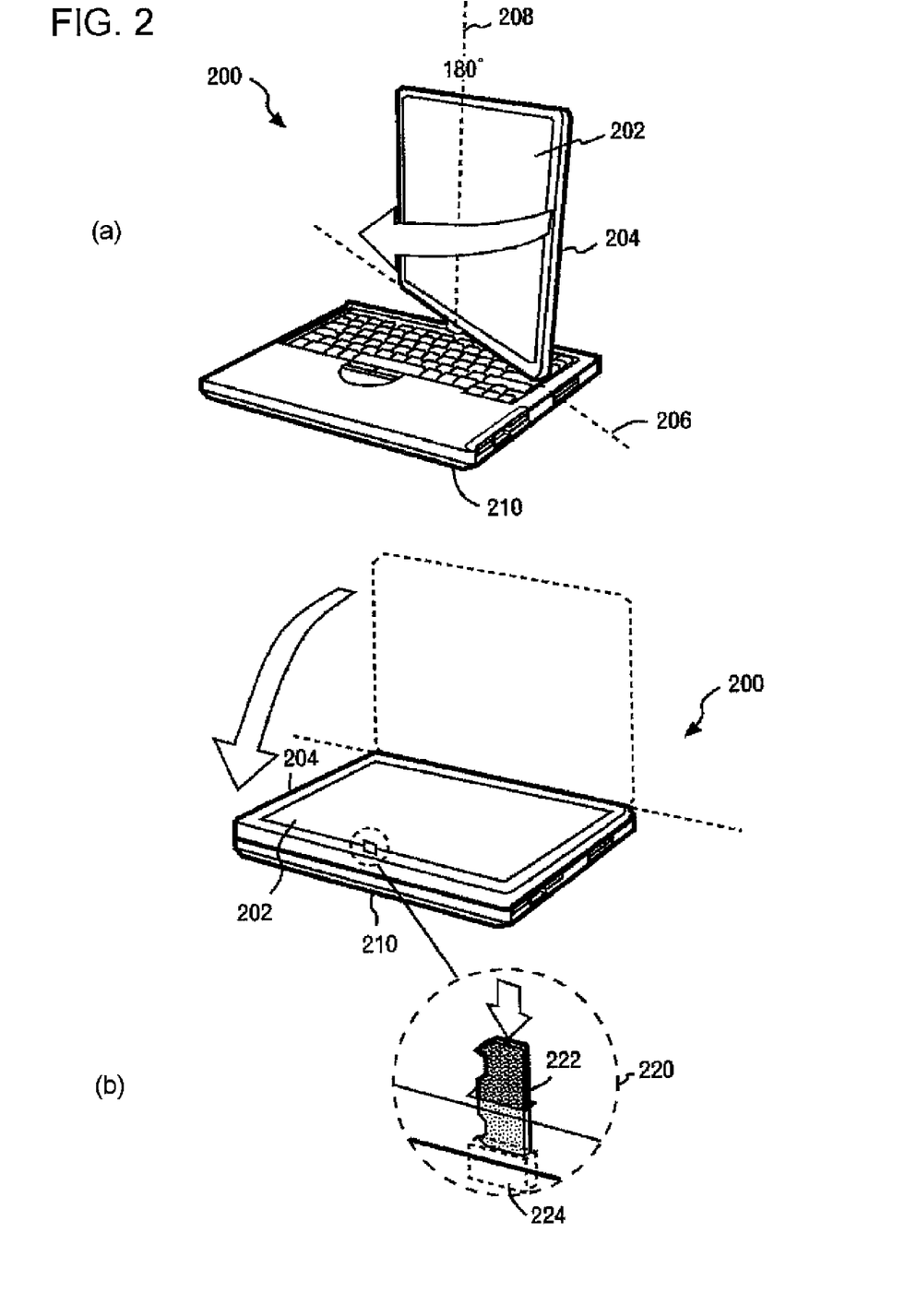
FIG. 2 shows an overview of the mechanism of a convertible PC according to the present invention, the convertible PC being usable as both a notebook PC and a tablet PC.

FIG. 2 shows an overview of a mechanism of a convertible PC 200 according to the present invention. The convertible PC 200 can be used as both a notebook PC and a tablet PC. As shown in FIG. 2(a), the convertible PC 200 is designed so that a cover unit 204 having a display screen 202 can be rotated by 180° about a rotation axis 208 from a state in which the convertible PC 200 is used in a notebook PC mode with the cover unit 204 being opened to a state in which the obverse surface of the cover unit 204 (i.e., the side where the display screen is provided) and the reverse surface (i.e., the side where there is no display screen, in other words, the exterior side when the cover is closed) are switched. The rotation axis 208 passes through the cover unit 204 and orthogonally crosses a horizontal axis 206, which lies along a lower edge portion of the cover unit 204, in the vicinity of the center of the horizontal axis 206. After the rotation by 180°, closing the cover unit 204 again allows the cover unit 204 to be overlaid on the upper surface of a main-body unit 210 with the obverse side of the cover unit 204 facing upward, as shown in FIG. 2(b). This arrangement allows the convertible PC 200 to be used in a tablet PC mode in which the display screen 202 is used as a handwriting input section.

Typically, for use in the tablet PC mode, the convertible PC 200 has a latch mechanism 220 that secures the cover unit 204 and the main-body unit 210 in order to prevent the cover unit 204 from being easily detached from the main-body unit 210 while the convertible PC 200 is being used or being transported in the tablet PC mode. That is, a latch (a center latch) 222 that projects toward the obverse side of the cover unit 204 is disposed in the vicinity of the center of the upper edge portion of the cover unit 204. The latch 222 has a structure such that it can be moved toward the reverse side of the cover unit 204 to cause the portion projecting toward the obverse side to disappear and to cause the latch 222 to project toward the reverse side. The main-body unit 210 has a latch receiving portion 224 (a latch receiving groove) at a portion that makes contact with the latch 222 that is made to project toward the reverse side of the main-body unit 210. The latch receiving portion 224 is engaged with the latch 222 to allow the cover unit 204 to be secured to the main-body unit 210.

Typically, when the cover unit 204 is closed in the notebook PC mode after use, the latch 222 is also used as a latch for securing the cover unit 204 and the main-body unit 210. That is, in this case, the cover unit 204 can be secured to the main-body unit 210, with the cover unit 204 closed, by shifting the latch 222 to a position in which it projects toward the obverse side of the cover unit 204 and does not project toward the reverse side and engaging the latch 222 with the latch receiving portion 224 provided in the main-body unit 210. Thus, the latch 222 always projects either toward the obverse side or toward the reverse side of the cover unit 204 to be usable in both states, i.e., a case in which the PC 200 is used in the tablet PC mode and a case in which the cover 204 is closed after use.

In the present invention, the latch 222 provided in the convertible PC 200 has the function of a reflector. A light source such as an LED (light-emitting diode) is provided in an embedded manner in the cover unit 204 in the vicinity of the latch 222, and light emitted from the light source is reflected by the reflector. This arrangement provides the same functions as those of a keyboard-illuminating light source disposed at a projected portion provided on the obverse side of the cover unit of a conventional notebook PC. The present invention, therefore, is aimed to allow the keyboard on the main-body unit 210 to be illuminated without forming an additional projected portion, other than the latch 222, at the obverse side of the cover unit 204.

Figure 3:
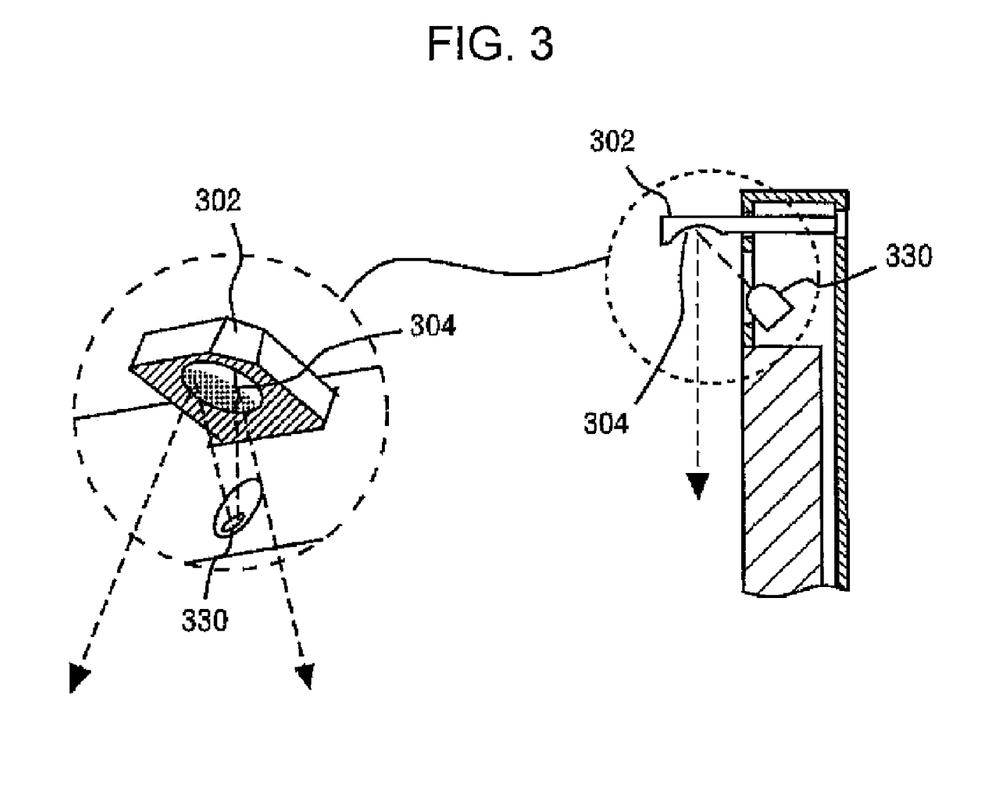
FIG. 3 shows one example structure based on a first embodiment of the present invention.
Figure 4:
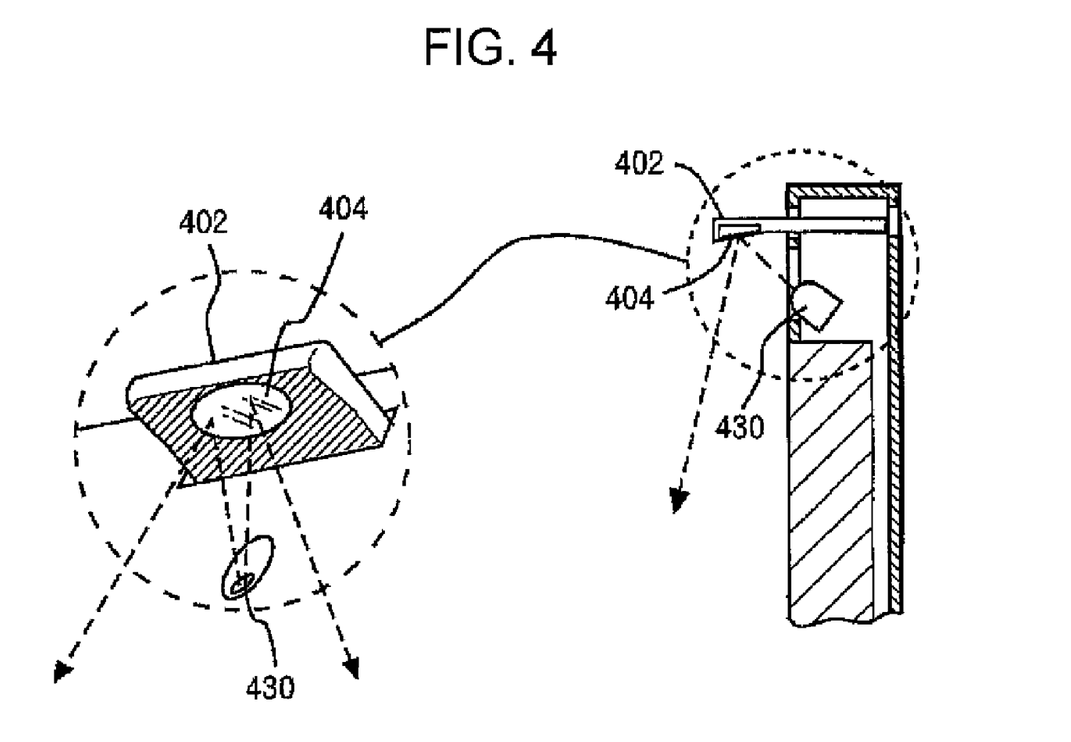
FIG. 4 shows one example structure based on the first embodiment of the present invention.
Figure 5:
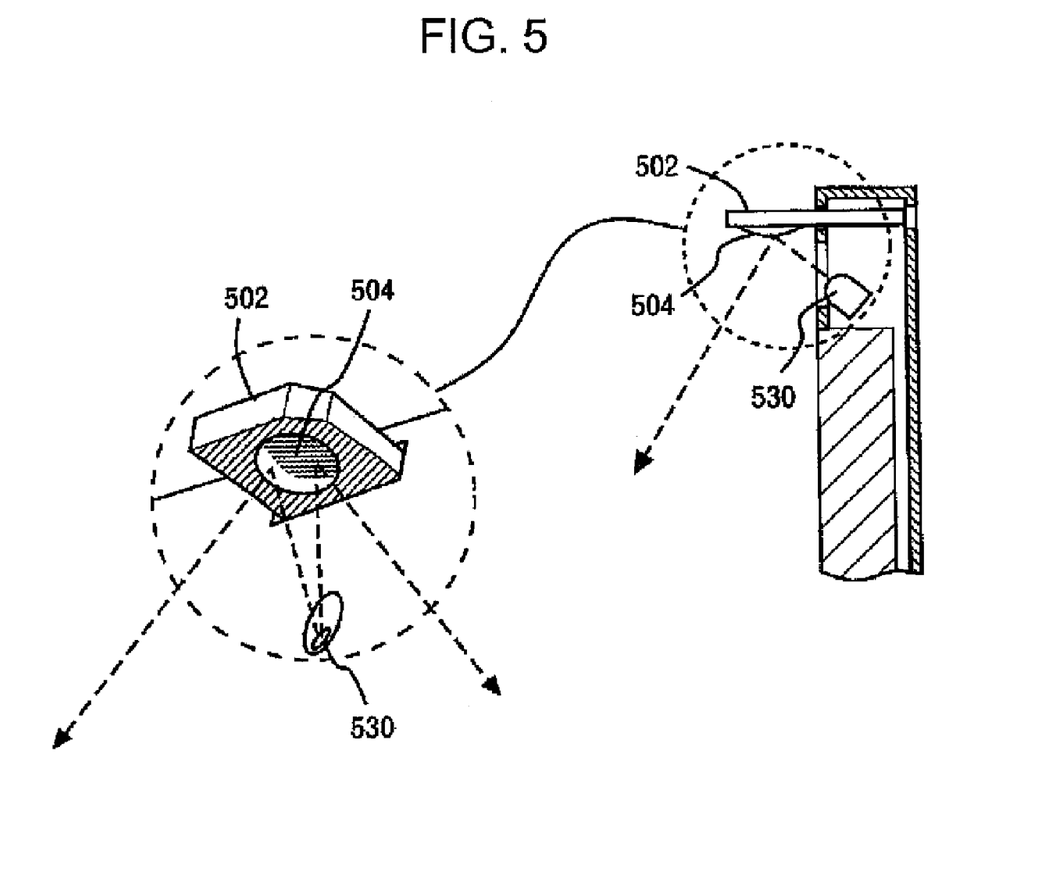
FIG. 5 shows one example structure based on the first embodiment of the present invention.

Embodiments of the present invention will be described below in light of the above-described situation. First, a structure according to a first embodiment of the present invention will be described below. In this structure, a light source, such as an LED, is provided in an embedded manner in the cover unit in the vicinity of the latch, provided in the vicinity of the center of the upper edge portion of the cover unit. Further, light is emitted from the light source to the latch and is reflected by a light-reflecting surface, provided on the latch, to illuminate the keyboard. FIGS. 3 to 5 show some example structures based on the first embodiment of the present invention. FIG. 3 shows an example of a case in which a concave light-reflecting surface 304 is provided at a portion of the latch 302. Only a light-reflecting surface 304 is subjected to silver bright plating that reflects light, and black material is used for the latch surface, other than the light-reflecting surface 304, to prevent users from being bothered by glare. This arrangement can reduce external light and can illuminate only a necessary area with reflected light.

While the area illuminated with light reflected from the light-reflecting surface 304 is also defined by the relationship between an illumination angle determined by specifications of an LED 330 and the distance from the LED 330 to the light-reflecting surface 304, changing mainly the shape of the reflecting surface can greatly adjust the illumination area. FIG. 4 shows an example of a case in which a flat light-reflecting surface 404 is provided at a portion of a surface of a latch 402. FIG. 5 shows an example of a case in which a convex light-reflecting surface 504 is provided at a portion of the obverse side of a latch 502. When the shape of the reflecting surface is changed from the concave surface to the flat surface and from the flat surface to the convex surface, a larger area can be illuminated correspondingly, but the amount of light per unit area decreases inversely due to light diffusion.

As described above, the area illuminated with the reflected light can be changed according to the shape of the reflecting surface. Thus, provision of multiple types of reflecting surfaces on a single latch to allow adjustment so that one of them can reflect light from the light source makes it possible to arbitrarily change the illumination area depending on the situation. Accordingly, a structure that allows the area illuminated with the reflected light to be changed in multiple levels, in such a manner, will be described as a second embodiment of the present invention.

Figure 6:
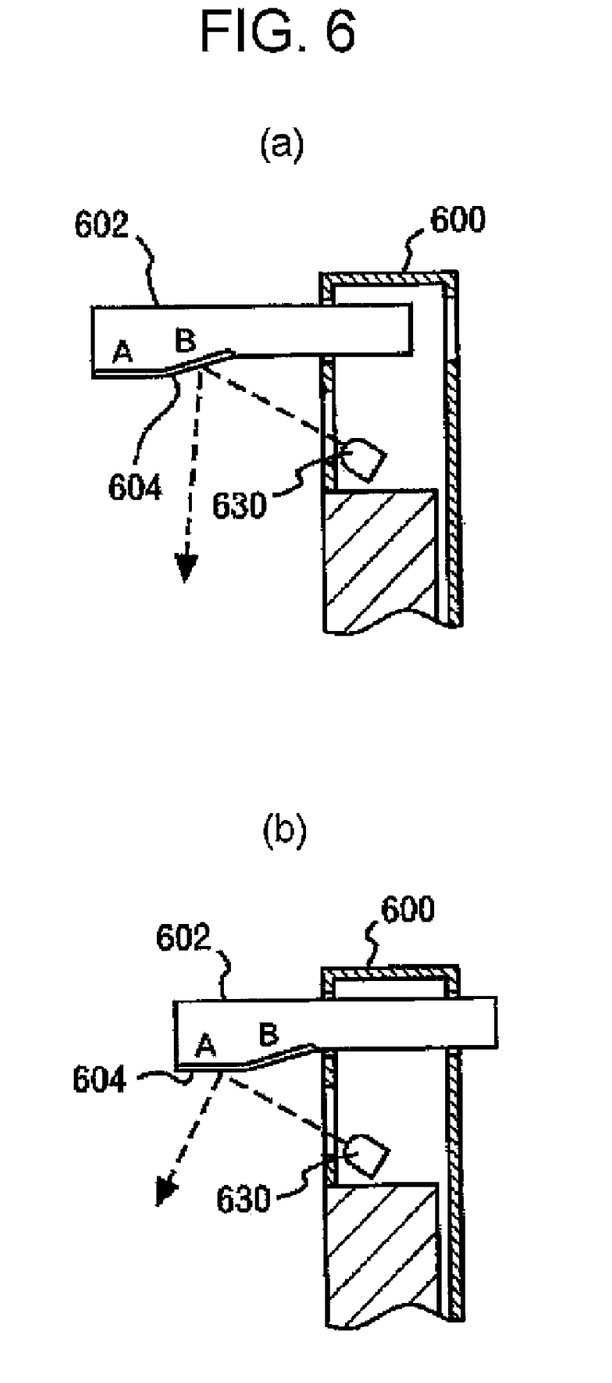
FIG. 6 shows one example structure based on a second embodiment of the present invention.

FIG. 6 is a cross-sectional view, taken from the side, of an example structure based on the second embodiment of the present invention. A light-reflecting surface 604 is provided on a latch 602 and has two types of reflecting surface, namely, a surface A and a surface B. The surface A has a flat shape (or a convex shape) and is disposed on the latch 602 at a position farther from the obverse side of a cover unit 600. On the other hand, the surface B has a concave shape (or a flat shape) and is disposed on the latch 602 at a position closer to the obverse side of the cover unit 600. The average angle of the reflecting surface of the surface B is varied from that of the surface A so that the light is reflected to an area closer to the cover unit 600 than the light reflected by the surface A.

FIG. 6(*a*) shows an embodiment when it is desired to increase the illumination intensity instead of relatively limiting the illumination area on the keyboard. That is, the latch 602 is drawn out by a larger amount from the obverse surface of the cover unit 600, so that illumination light emitted from an LED 630 is received and reflected by mainly the surface B of the light-reflecting surface 604. The surface B has a concave shape (or a flat shape) and the angle of the reflecting surface is also adjusted so that the light is reflected to an area closer to the cover unit 600. Thus, compared to a case in which the illumination light is reflected by the surface A, the illumination area is restricted but the illumination intensity on the illumination surface can be increased (i.e., can be made bright) correspondingly. FIG. 6(*b*) shows an embodiment when it is desired to relatively increase the illumination area while the illumination intensity on the keyboard is reduced. That is, the latch 602 is drawn out by only a small amount from the obverse surface of the cover unit 600, so that that illumination light emitted from the LED 630 is received and reflected by mainly the surface A of the light-reflecting surface 604. The surface A has a flat shape (or a convex shape), and no such adjustment that causes the light to be reflected to an area closer to the cover unit 600 is made to the angle of the reflecting surface. Thus, a larger area can be illuminated than a case in which the illumination light is reflected by the surface B, but the illumination intensity on the illumination surface decreases (i.e., becomes dark) correspondingly.

Among today's portable computers, so-called "slim bezel" portable computers, in which the ratio of the area of the display screen to the area of the obverse surface of the cover unit is close to 100%, i.e., the frame portion around the display screen portion is extremely narrow, are becoming mainstream. In such a "slim bezel" portable computer, since the area of the upper side (i.e., the upper bezel portion) of the display screen portion on the cover unit is limited, it is difficult to install a light source, such as an LED, below a latch. Accordingly, as a third embodiment of the present invention, a description will be given of a case in which the area above the display screen portion on the cover unit is small, as described above, and the space must be efficiently used to dispose a light source.

Figure 7:
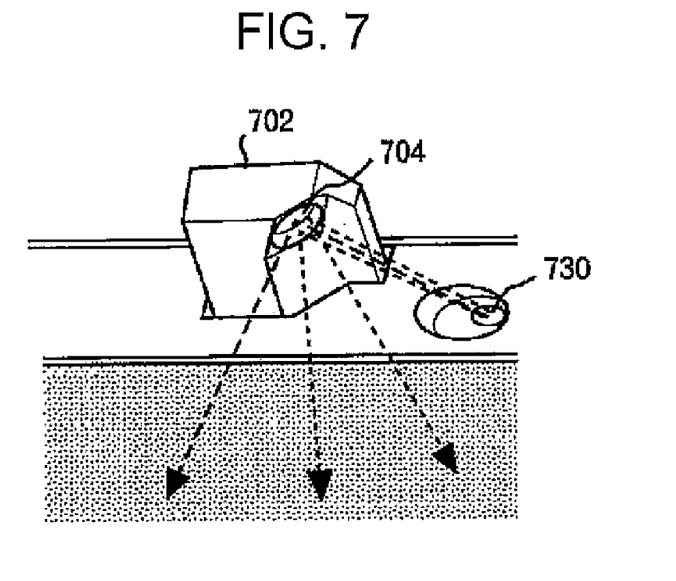
FIG. 7 shows one example structure based on a third embodiment of the present invention.

FIG. 7 is an example structure based on the third embodiment of the present invention. An LED 730 is disposed at either the right side or the left side when viewed from a latch 702, and light is emitted from substantially the side to a light-reflecting surface 704, which is provided at the latch 702. It is desired that the reflection angle of the reflecting surface be appropriately adjusted to the left and right so that the illumination light emitted from the side can be reflected toward the keyboard surface. Since there is a distance between the latch 702 and the LED 730 compared to the cases in which the LED is disposed below the latch, it is desired that an LED having a small illumination angle be selected and the shape of the reflecting surface be convex.

Figure 8:
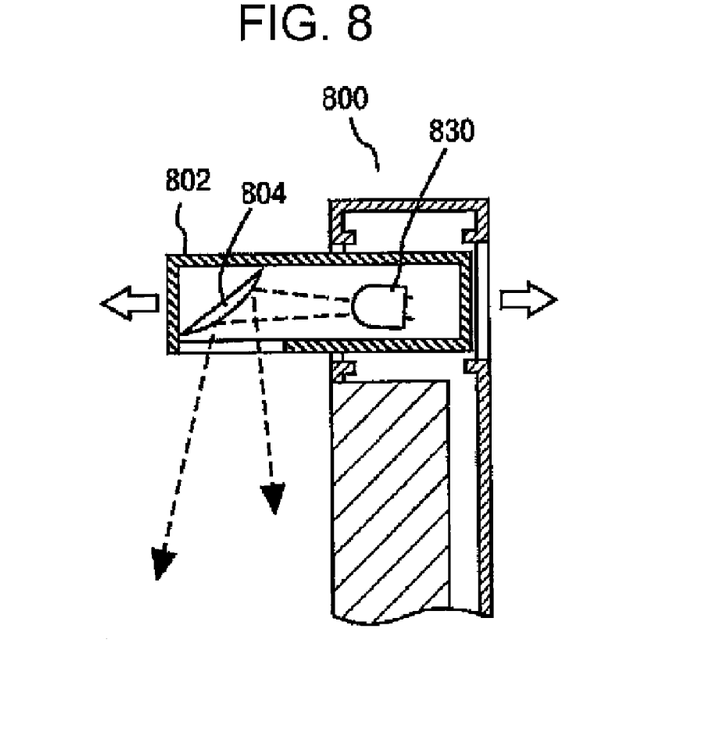
FIG. 8 shows one example structure based on the third embodiment of the present invention.

FIG. 8 shows another example structure based on the third embodiment of the present invention. In this example, a latch 802 does not have a low-profile shape, but has a relatively thick rectangular-parallelepiped shape and has a hollow portion therein. The latch 802 has a light-reflecting surface 804 at its end at the obverse side of a cover unit 800, along the moving direction of the latch. The latch 802 has an opening at a portion below the reflecting surface 804 so that light emitted through the hollow portion can be reflected onto the keyboard surface. On the other hand, an LED 830 is disposed in the hollow portion in the latch 802, at a position away from the light-reflecting surface 804, and is directed so as to allow light to be emitted to the light-reflecting surface 804.

Although the descriptions for the above embodiments have been given of examples in which only one latch is disposed, multiple latches can also be disposed. In such a case, at least one of the latches (i.e., including the case of all of the latches) can have the structure(s) as illustrated in FIGS. 3 to 8. For example, when two latches are disposed and are provided with the above-described reflecting surfaces and the adjacent light sources, respectively, the two light sources can illuminate the keyboard and so on and can thus increase the illumination intensity on the keyboard and so on to be illuminated. When only one of the two light sources is turned on, it is possible to illuminate the keyboard and so on with the illumination intensity provided by only one light source. When the convertible PC according to the present invention is provided with two latches in such a manner, it is desired that the latches be positioned at the same distance away from the center of the upper edge of the cover unit. Two latch receiving portions are further disposed in the main-body unit at positions corresponding to those two latches so as to engage therewith when the cover unit is closed. With this arrangement, when the convertible PC is used in the tablet PC mode, the two latches can be engaged with latch receiving portions that are different from those used for engagement when the cover unit is closed, so that the cover unit can be secured to the main-body unit when used in the tablet PC mode.

An embodiment for a case in which the present invention is considered from the view point of a light source will be described next. As described above, it is most desirable that a light-emitting diode (LED) be used as a light source for implementing the present invention, when the cost, the size, the amount of light, and so on are considered. Thus, in the following embodiment, a description will be given of only a case in which an LED is used as the light source. However, naturally, this is not intended to exclude the possibility that a light source other than an LED is used as a light source in the present invention.

Figure 9:
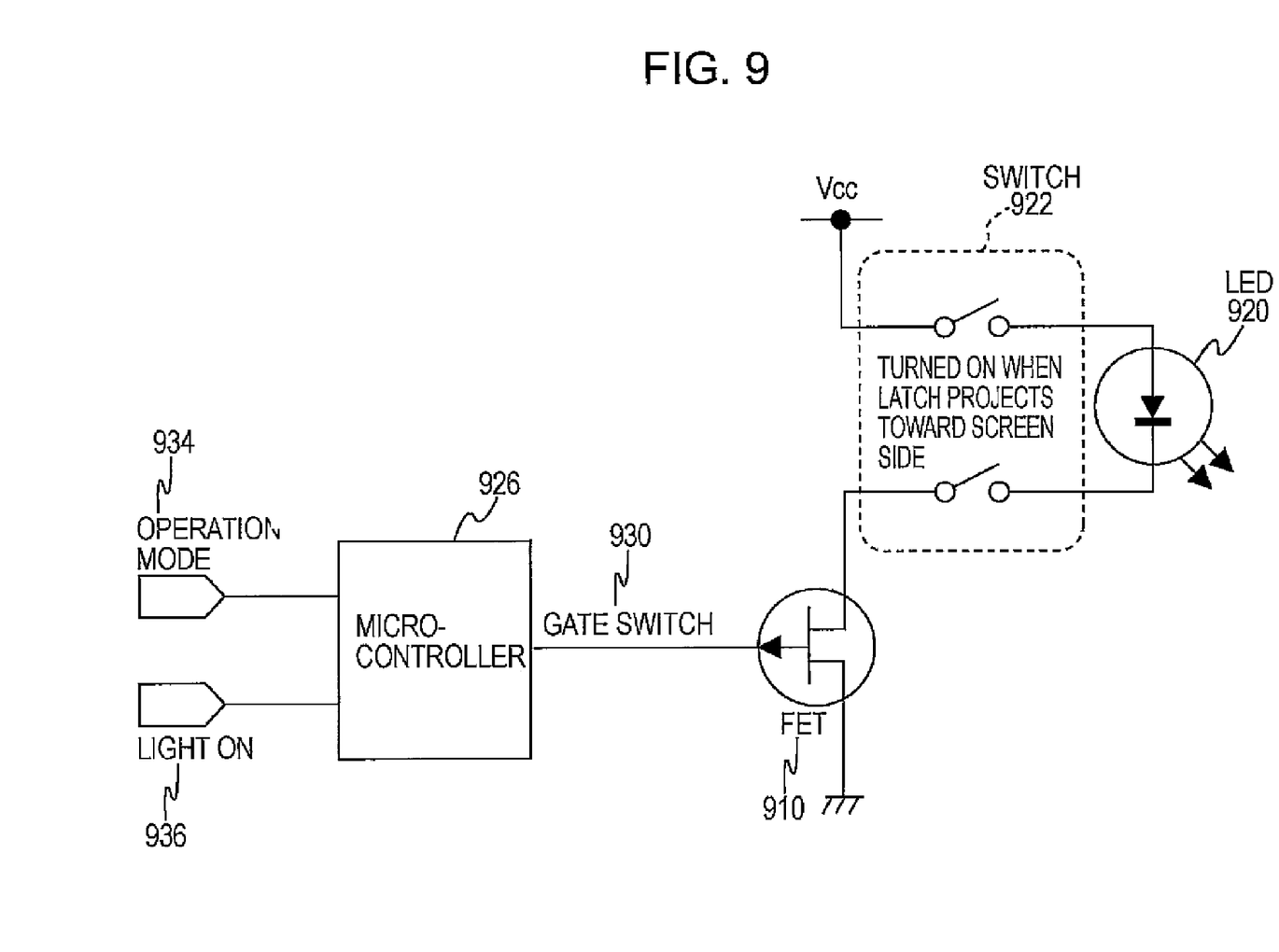
FIG. 9 shows an embodiment of a circuit of an illumination light source according to the present invention.

FIG. 9 shows an embodiment of the circuit of an illumination light source according to the present invention, in which an LED 920 is used as the illumination light source. A switch 922 represents a contact switch that is turned on and off in synchronization with the sliding operation of a latch (e.g., the latch 302 shown in FIG. 3) according to the embodiment of the present invention. That is, when the latch is slid so that it projects toward the obverse side of the cover unit in order to cause the latch to serve as a reflector for illumination light, the switch 922 is turned on. Conversely, when the latch is slid so that it projects toward the side opposite the obverse side of the cover unit, the switch 922 is turned off.

An FET 910 serves as a switch whose on/off state is controlled by a gate switch signal 930, which is a signal output from a microcontroller 926. An operation-mode signal 934 and a light-on signal 936 are input to the microcontroller 926. The operation-mode signal 934 indicates whether the present usage state of the convertible PC is the tablet PC mode (e.g., "low" in this case) or the notebook PC mode (e.g., "high" in this case). The light-on signal 936 indicates whether the user of the convertible PC is intentionally giving an illumination-on request (e.g., "high" in this case) or giving or an illumination-off request (e.g., "low" in this case) through an input via the keyboard or the like. The microcontroller 926 detects the input signals. Only when the operation-mode signal 934 has a value indicating the usage state in the notebook PC mode and the light-on signal 936 has a value indicating a state in which an illumination-on request is issued, the microcontroller 926 performs control so as to output the gate switch signal 930 for turning on the gate of the FET 910. With this arrangement, the convertible PC in the embodiment shown in FIG. 9 can be configured so that the illumination light is turned on only when the convertible PC is used in the notebook PC mode, the user gives an illumination-on request, and the latch disposed at the upper portion of the cover unit is drawn out toward the obverse side.

Another embodiment for a case in which the present invention is considered from the view point of a light source will be further described. A basic concept of the present invention is that the keyboard and so on are illuminated by causing a latch having a light-reflecting surface to reflect illumination light emitted from a light source, rather than by direct light emitted from a light source. Accordingly, the illumination intensity on the keyboard surface and so on to be illuminated depends on the reflectance value of the light-reflecting surface. Thus, for example, when the reflectance value of the light-reflecting surface varies from product to product due to manufacturing variations, it is difficult to always obtain a uniform illumination-intensity on the keyboard. FIG. 10 shows an embodiment in which, in order to overcome such a problem, illumination-intensity sensors for detecting illumination due to reflected light are provided and illumination intensity values read by the illumination-intensity sensors are fed back to adjust the brightness of the light source.

Figure 10A:
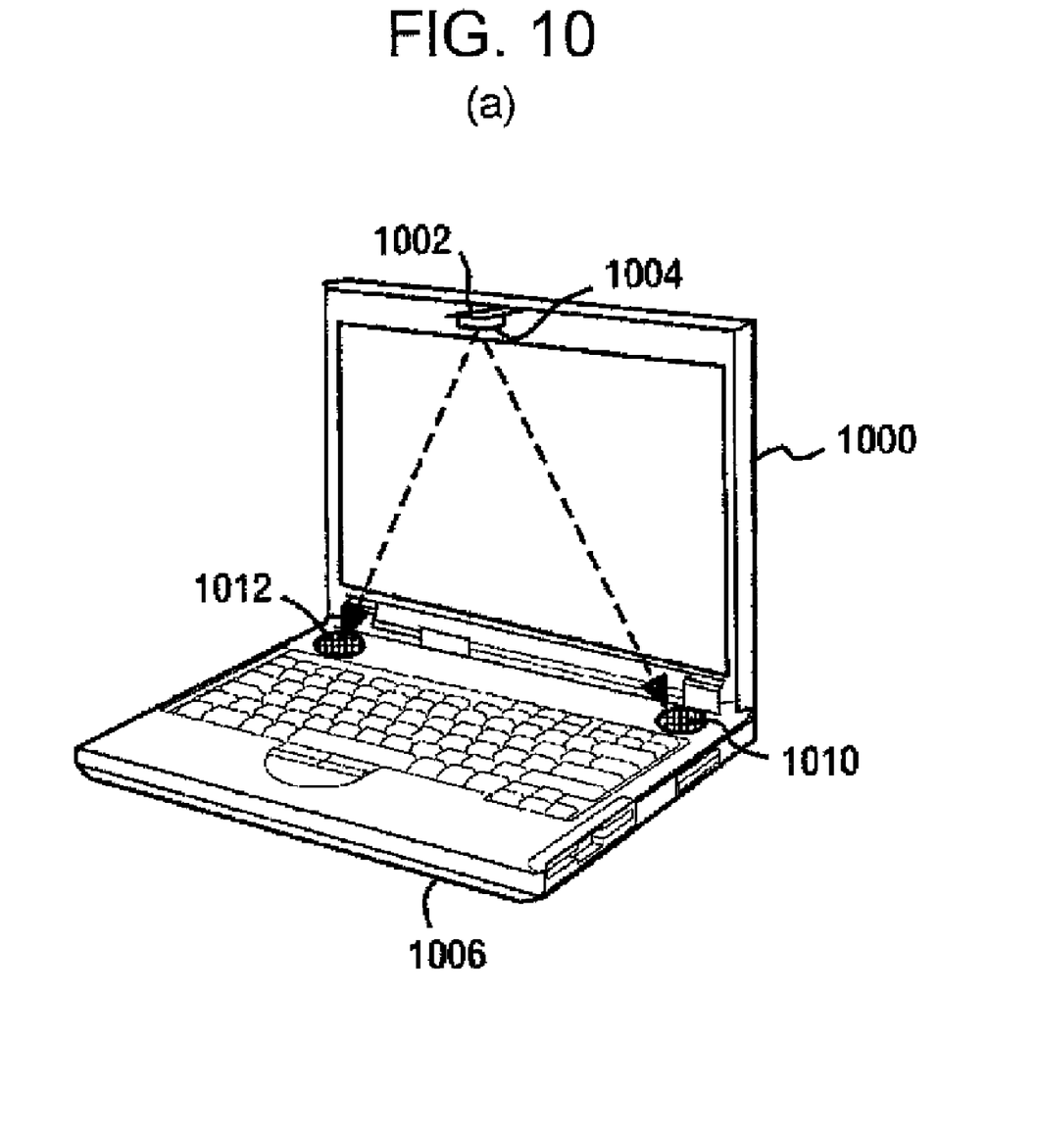
FIG. 10 shows an embodiment of the circuit of an illumination light source according to the present invention, a function for feeding back illumination-intensities from illumination-intensity sensors being incorporated into the illumination light source.

FIG. 10(*a*) shows an overview of the external structure of the convertible PC according to this embodiment. Illumination-intensity sensors 1010 and 1012 are provided on the upper surface of a main-body unit 1006 to detect the illumination intensities of illumination caused by light reflected from a light-reflecting surface 1004, which is disposed at a latch 1002 provided at an upper portion of a cover unit 1000. As the illumination-intensity sensors, phototransistors or the like may be used, or CCDs or the like can also be used when high accuracy is required.

Figure 10B:
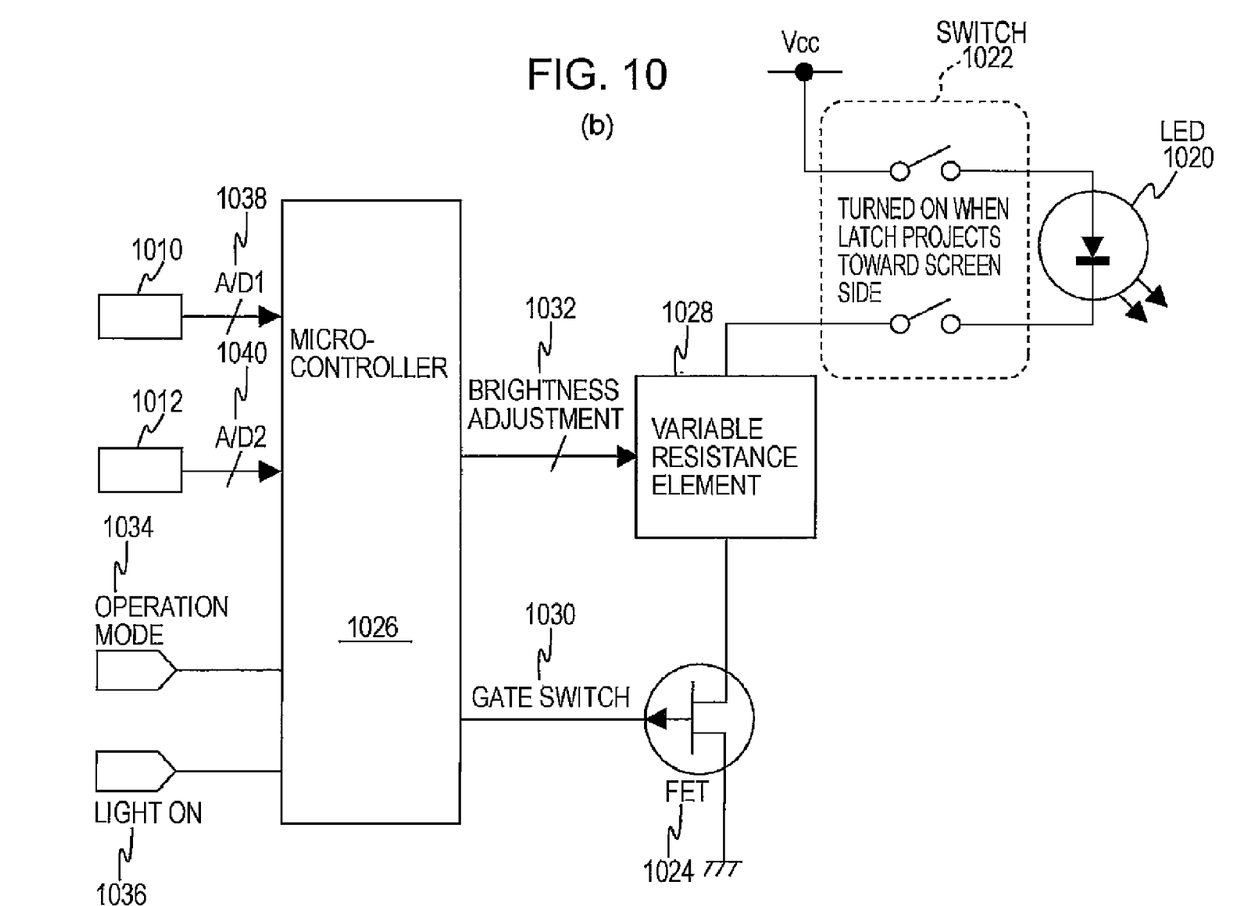

FIG. 10(*b*) shows an embodiment of the circuit of an illumination light source using an LED 1020 according to the present invention. A function that allows the brightness of the light source to be adjusted based on inputs from the illumination-intensity sensors 1010 and 1012 is incorporated into this embodiment. Similarly to the switch 922 shown in FIG. 9, a switch 1022 represents a contact switch that is turned on/off in synchronization with the sliding operation of the latch (e.g., the latch 302 shown in FIG. 3) according to the embodiment of the present invention. Similarly to the FET 910 shown in FIG. 9, an FET 1024 also serves as a switch whose on/off state is controlled by a gate switch signal 1030, which is a signal output from a microcontroller 1026. A variable resistance element (potentiometer) 1028 that adjusts current flowing in the LED 1020 to adjust the brightness of light emitted by the LED 1020 is provided between the LED 1020 and the FET 1024. The variable resistance element 1028 can be set at an appropriate resistance in accordance with a value of a brightness adjusting signal 1032 (a multiple-bit digital signal) output from the microcontroller 1026.

Other than an operation-mode signal 1034 and a light-on signal 1036, an A/D 1 signal 1038 and an A/D 2 signal 1040 are also input to the microcontroller 1026 from the illumination-intensity sensors 1010 and 1012. The A/D 1 signal 1038 and the A/D 2 signal 1040 are signals (multiple-bit digital signals) obtained by A/D-converting the illumination intensities detected by the sensors 1010 and 1012 into digital values. Adjustment of the brightness of the LED 1020 by increasing or reducing the value of the brightness adjusting signal 1032 so that the values of the A/D 1 signal 1038 and the A/D 2 signal 1040 fall within a certain range allows the illumination due to reflected light to be maintained in a certain range of illumination intensities.

Although the present invention has been described above using the embodiments, it goes without saying that the technical scope of the present invention is not limited to the scope described in the embodiments described above. It is apparent to those skilled in the art that various modifications and improvements can be made to the embodiments described above. It is also clear from the scope of the claims that a mode to which such a modification or improvement has been made is also encompassed by the technical scope of the present invention.

The invention claimed is:

1. A portable computer having a main-body unit including a keyboard and a cover unit having a display screen on one surface, comprising:
   a latch provided in the cover unit in the vicinity of an upper edge of the display screen;
   a latch receiving portion provided in the main-body unit, wherein when the cover unit is closed, the latch receiving portion is engaged with the latch to secure the main-body unit and the cover unit in the position where the cover unit is closed;
   a light source embedded in the cover unit in the vicinity of the latch; and
   a light-reflecting surface provided on a surface of the latch so that, when the cover unit is open, a light from the light source can be reflected to the keyboard for illuminating the keyboard.

2. The portable computer according to claim 1, wherein the display screen further serves as a tablet input section that allows information to be input through a pen or handwriting.

3. The portable computer according to claim 2, wherein the cover unit having the display screen serving as a tablet input section is rotatable by at least 180 degrees around an axis that is orthogonal to a horizontal axis and passes through the display screen at a position where the cover unit is opened.

4. The portable computer according to claim 3, wherein
   an edge portion of the cover unit in the vicinity of the upper edge of the display screen has a shape that does not substantially project from a surface having the display screen, and
   the latch is movable between a position in which the latch does not project from the surface and a position in which the latch projects from the surface.

5. The portable computer according to claim 4, wherein the edge portion of the cover unit is substantially flush with the display screen.

6. The portable computer according to claim 5, wherein the latch is located at a position where the orthogonal axis passes through and is positioned at substantially the same distance from the left and right edges of the display screen.

7. The portable computer according to claim 4, wherein the light source is a light-emitting diode (LED).

8. The portable computer according to claim 7, wherein the display screen comprises a liquid crystal display (LCD).

9. The portable computer according to claim 8, wherein the light-reflecting surface is obtained by mirror-finishing a surface of the latch.

10. The portable computer according to claim 9, wherein a portion other than the light-reflecting surface in the latch is subject to antiglare processing.

11. The portable computer according to claim 10, wherein the light-reflecting surface is a flat mirror.

12. The portable computer according to claim 11, wherein the light-reflecting surface is a concave mirror, and the light source is provided at the same distance to the light-reflecting surface or at a position close to the light-reflecting surface compared to a case in which the light-reflecting surface is a flat mirror.

13. The portable computer according to claim 11, wherein the light-reflecting surface is a convex mirror, and the light source is provided at the same distance to the light-reflecting surface or at a position away from the light-reflecting surface compared to a case in which the light-reflecting surface is a flat mirror.

14. The portable computer according to claim 13, wherein when the latch is located at a position where the latch does not project from the surface of the cover unit, the latch projects toward a rear-surface side of the cover unit to allow the rear surface to be secured in an overlapping state in which the rear surface opposes the keyboard of the main-body unit.

15. The portable computer according to claim 14, wherein the light source further comprises a control circuit that is capable of turning on the light source only when the latch is in a position where the latch projects from the surface and the cover unit is open.

16. The portable computer according to claim 15, wherein a function for adjusting a brightness of the light source is provided to change an illumination intensity on the keyboard.

17. The portable computer according to claim 16, wherein the latch comprises multiple latches; a surface of at least one of the latches has a light-reflecting surface; and a light source for causing a light to enter into the light-reflecting surface is embedded from the surface of the cover unit in the vicinity of the corresponding latch.

18. A portable computer having a main-body unit including a keyboard and a cover unit having a display screen on one surface, comprising:
   a latch provided in the cover unit in the vicinity of an upper edge of the display screen, internally having columnar hollow portion along the movable direction of the latch, and having an opening in a predetermined part at one end of the hollow portion;
   a latch receiving portion provided in the main-body unit, wherein when the cover unit is closed, the latch receiving portion is engaged with the latch to secure the main-body unit and the cover unit in the position where the cover unit is closed;
   a light source provided at an end, which is the end at the opposite side from said one end having the opening in the hollow portion of the latch, in a direction for irradiating a light toward said one end; and
   a light-reflecting surface provided at said one end of the latch so that, when the cover unit is open, a light from the light source can be reflected through the opening so as to illuminate the keyboard.

\* \* \* \* \*